May 13, 1930.  F. A. REYNOLDS ET AL  1,758,621
SEED CELLING MACHINE
Filed April 7, 1926   6 Sheets-Sheet 5
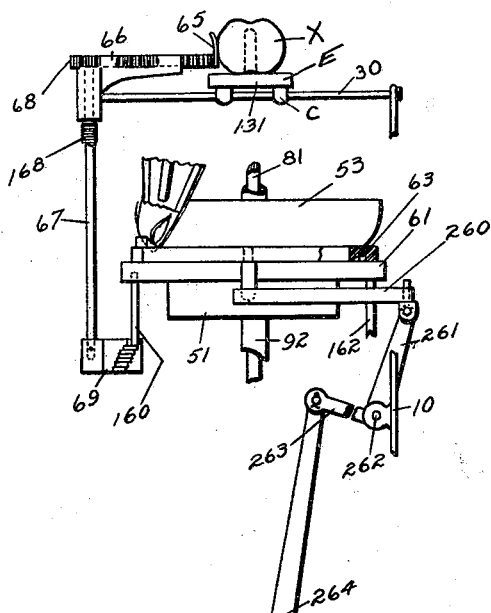
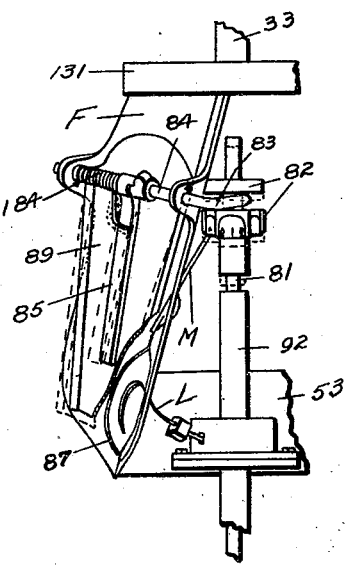
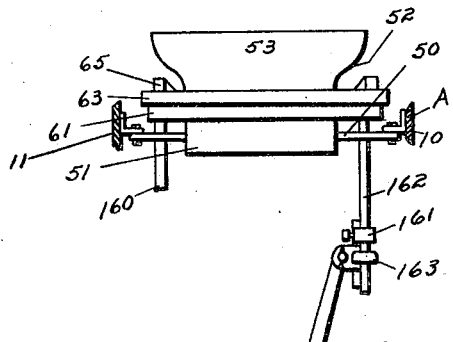
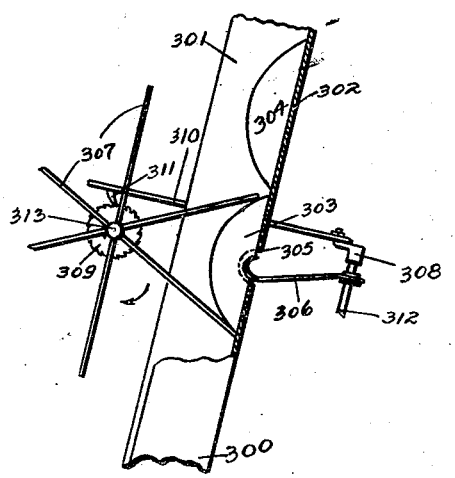
Fig. 9.
Fig. 10.
Fig. 11.
Fig. 12.
INVENTORS
Frank A. Reynolds
Lucien F. L. Turcotte
BY
Gardner W. Pearson
ATTORNEY.

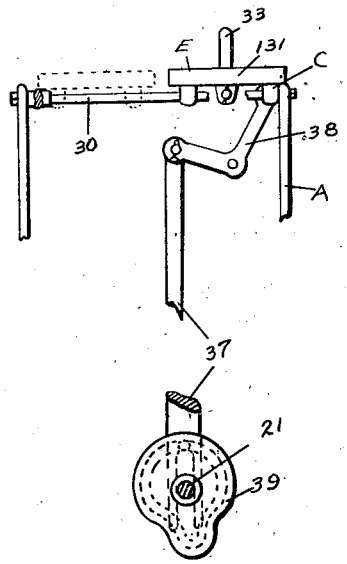
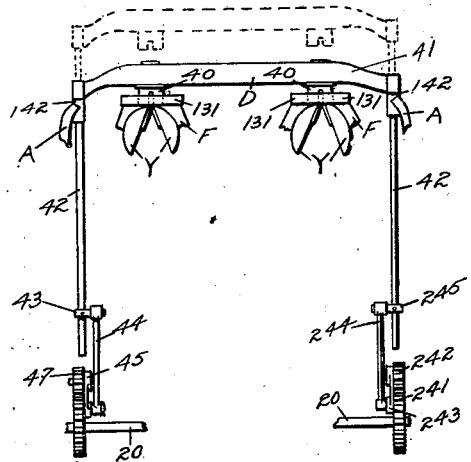
Fig. 5.   Fig. 6.
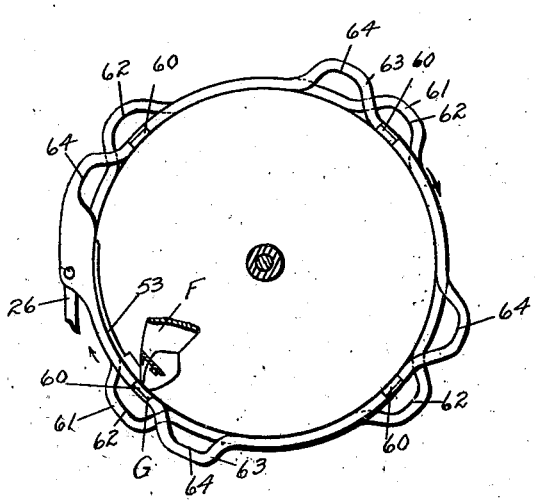
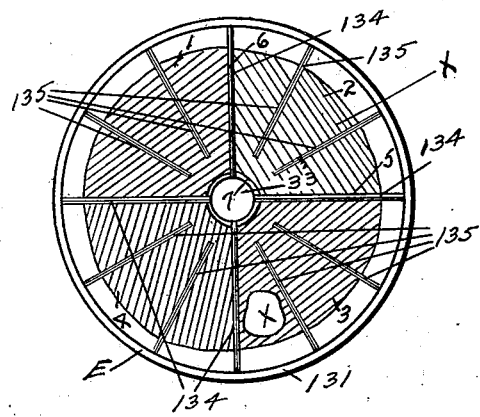
Fig. 8.
Fig. 7

May 13, 1930.　　F. A. REYNOLDS ET AL　　1,758,621
SEED CELLING MACHINE
Filed April 7, 1926　　6 Sheets-Sheet 6

INVENTORS
Frank A. Reynolds
Lucien F. L. Turcotte
by Gardner W. Pearson
ATTORNEY.

Patented May 13, 1930

1,758,621

UNITED STATES PATENT OFFICE

FRANK A. REYNOLDS AND LUCIEN F. L. TURCOTTE, OF LOWELL, MASSACHUSETTS, ASSIGNORS, BY MESNE ASSIGNMENTS, TO LOWELL MACHINE COMPANY, A CORPORATION OF MASSACHUSETTS

SEED-CELLING MACHINE

Application filed April 7, 1926. Serial No. 100,336.

This invention relates to machines for rapidly and automatically removing or cutting out the seed cells from apples or similar fruit after they have been cored and preferably pared by other machines or devices.

After being cored, the apple is left with a cylindrical hole extending from the stem hole diametrically through it, most of the seeds, part of the seed cells, the stem, etc. having been removed. Preferably the apple also should have been peeled.

We are aware that there are seed celling machines in which a knife holder is pushed up into the cylindrical hole in the fruit, a curved knife is then expanded from the holder and the fruit or knife is then revolved to remove the remaining seed cells. The objection to this type of machine however is that instead of cutting out the cells with a clean cut, they are ground or chewed out, and the resulting pulp is very difficult to handle as it has a tendency to gum up the machine in a very objectionable manner.

In our machine and by our method we take the peeled and cored fruit and, preferably, automatically cut it into quarters or segments, each of which drops into a chute made with sides which diverge at a little greater angle than the segments. Down this chute each segment moves by gravity or otherwise until it strikes a baffle plate or gauge plate which stops it at the desired point.

Preferably this baffle plate or gauge plate is automatically adjusted according to the size of the fruit so that the middle point, where are located the seed cells either of a small or large fruit, will rest in a suitable knife opening. Through this knife opening a curved knife is caused to pass thereby cleanly cutting out the seed cells and some of the adjoining body of the fruit without making any pulp.

Preferably when the segment stops in position, an automatic cover is brought down against it to hold it firmly in place and the baffle plate is removed. After the cutting, this cover is released and the segment will drop into a suitable receptacle through gravity, or it may be pushed out by means of a suitable plunger or ejector.

In its preferred form, we make an automatic circular machine in which there is a carrying arm on the end of which is a fruit supporting finger, around the bottom of which is a fixed segment cutter, and on this the operator places the fruit. This arm carries the fruit underneath a plunger which forces it down through the cutter thus segmenting it and allowing each of the segments to fall into its chute, such chutes being arranged around a central point which is the center of revolution of the cutting knife. All the mechanisms and movements are arranged in a circular manner as we believe this to be the most compact, serviceable and rapid machine.

The principle of our machine, of cutting the fruit into segments, then holding each segment while a knife cuts out the cells however can be applied to other types of non-circular machines.

The gauging means, or means to adjust the position of each segment according to size of the fruit can be dispensed with if the fruit is sorted in advance and is all of the same diameter.

The means to hold each segment in position can also be omitted if the knife is sharp enough to make a clean cut without pushing the fruit outward, and the means for releasing is also therefore unnecessary as well as the means to eject the finished segment.

In the preferred embodiment of our invention there are two sets of mechanism arranged side by side, whereby the operator can feed fruit to the machine with each hand.

We prefer to use four receiving and guiding chutes but might use more or less.

We prefer also to so cut that the four quarters are separate and each drops into its chute but also, at the time of cutting, to partly cut each quarter into thirds as this saves afterwards re-cutting the quarters. Segments of one twelfth the circumference are in demand by the trade.

We claim the machine for, and the process of cutting out the seed cells.

In the drawings, Fig. 1 is a front elevation of our device applied to a duplex automatic machine, some of the parts being shown in perspective.

In Figs. 1 and 2 various parts are broken away.

Fig. 5 is a detail showing the fruit feeding mechanism.

Fig. 6 is a front elevation showing the plunger mechanism in the position it assumes just as the fruit is completely cut.

Fig. 7 is a detail plan view of the two turrets.

Fig. 8 is a sectional diagrammatic view of the mechanism for cutting the fruit in segments.

Fig. 9 is a detailed elevation of the gauging mechanism and also the mechanism for oscillating the top turret.

Fig. 10 is a perspective showing the mechanism for operating the cover of a chute.

Fig. 11 is a detail showing the mechanism for vertically resetting the two turrets.

Fig. 12 is a diagrammatic sectional side elevation showing a view similar to Fig. 4 of a modification of the holding and discharging devices.

Figure 1:
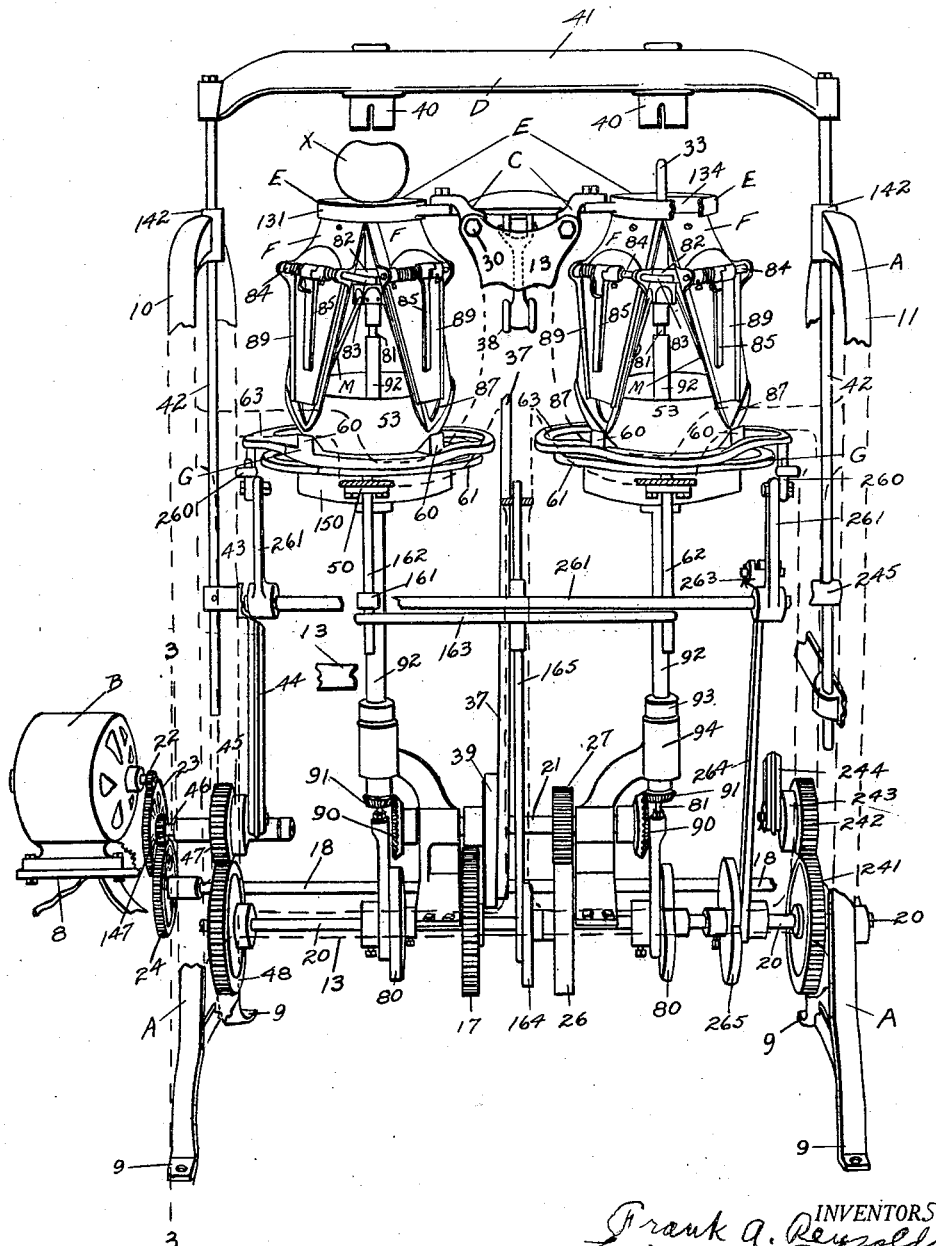

In the drawings, A represents a frame of any suitable form shown as having sides 10 and 11, each having two legs such as 9, 9, back girts 12, 12, and front girts 13, 13.

The driving means is shown as an electric motor B suitably supported by a bracket 8 attached to the frame A, such motor having on its shaft a small gear 22 which engages a larger gear 23 carried by stub shaft 46 which also carries a reducing gear 147.

This drives the gear 24 which drives the main shaft 18.

Main shaft 18 carries a reducing gear 117, which engages and drives main drive gear 17 on cam shaft 20.

The fruit such as apples X or Y are peeled and have the core cut out so that there is a vertical core hole through the axis and it is thus they are fed to the machine.

Between the back and front of the frame A, at the top, are the carrier tracks 30, 30, on which travels a feed carrier C on each side of which are the slicers or cutters E, which as shown, include a metal ring 131 with four blades 134, 134, 134, 134, in the form of a cross. From the center projects upward the finger 33 of a size so that each fruit can slip over it.

Between each two adjoining main blades 134, we prefer to insert two auxiliary blades 135, 135, as shown in Fig. 8, so that the fruit, as shown by the dotted lines, will be separated into four quarters each of which will be nearly severed into three segments.

For convenience in feeding, this carrier C is caused to move towards and from the operator by means of the bell crank 38 pivoted to the rod 37 which is caused to move up and down by the cam 39 on shaft 21. 37 moves up and down and actuates bell crank 38.

The plunger mechanism D includes the two heads 40 and 40 which are slotted so that they can pass down through the blades 134 and 135, such heads being carried by the cross beam 41, supported by vertical slide rods 42, vertically movable in bearings 142, 142, in frame A.

These rods are caused to reciprocate vertically by means of the connecting rod 44 pivoted at 43 to one of the rods 42.

Connecting rod 44 is pivoted at its other end to crank 45 carried by intermittent gear 47 driven by intermittent gear 48 on cam shaft 20.

At the other side, there is an intermittent gear 241 on shaft 20 which engages intermittent gear 242 on a suitable shaft, which carries a crank 243 which by means of connecting rod 244 connects to the other rod 42 at a coupling 245.

Carried by a bracket 50 fixed to frame A is a cell receiving tube 150 to the top of which is attached a base ring 51 having on the outside an annular shoulder 52 and an upwardly extending knife ring 53. To ring 53 are fixed the bottoms of four chutes F, F, F, F, each located under and between two blades 134, 134, so that as a fruit is cut into segments by the downward movements of the plunger heads 40, 40, each segment is forced or slips into a chute. The sides of each chute are positioned at an angle of about 95° with each other or at an angle which is slightly greater than that between adjoining blades 134, 134.

By making this angle slightly greater, the tendency of the fruit to stick is limited to one side, because there is an air space between it and the chute at the other.

Figure 4:
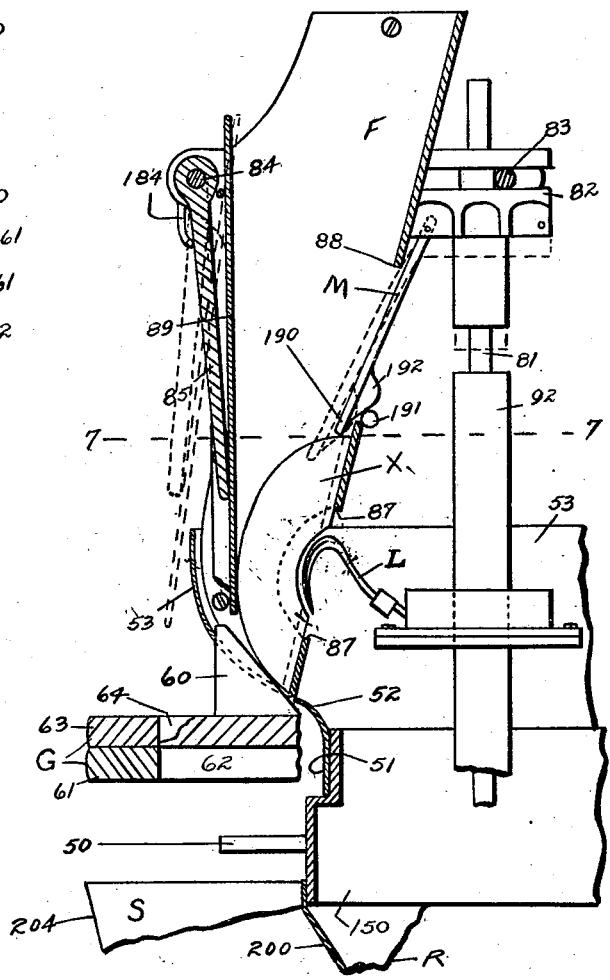
Fig. 4 is a sectional detail showing one of the fruit segment chutes with the cutting knife.
Figure 13:
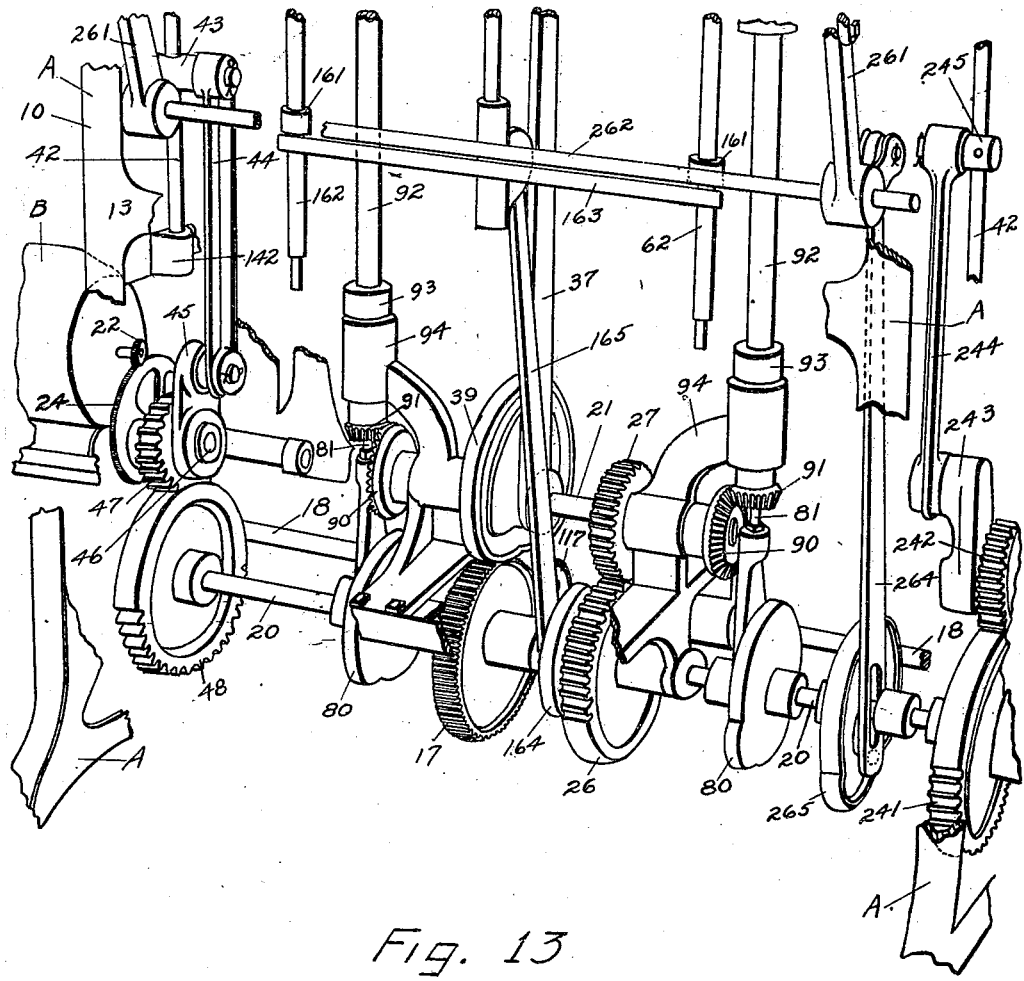
Fig. 13 is a perspective showing the relative arrangement of the cams and gears by which the various movements are produced.

The bottom of each chute F rests in a V-shaped depression in ring 53 and has a cutting slot 87 through the edges of adjoining sides, as seen in Fig. 4.

Chutes F, F, F, F, are fastened together at their tops and are therefore substantially self-supporting.

Each segment loosely fits its chute and slides down until it is stopped by the gauge mechanisms G.

This gauge mechanism includes a bottom turret 61 with four openings 62, 62, 62, 62, and top turret 63 which also has four openings 64, 64, 64, 64, adapted to register with 62, 62, 62, 62, and the four gauge stops 60, 60, 60, 60, as seen in Fig. 7.

Both turrets encircle base ring 51 and are vertically slidable while top turret 63 can also oscillate thereon.

The purpose of this mechanism is to accurately position a segment of a large or small apple so that it will be in the path of the cutting knife L.

When the fruit is fed, the stops 60, are each just below a chute F so as to be hit by a descending segment. It is clear that if top turret 63 and stops 60 are raised, the seed cells of a small fruit segment will be positioned with reference to cutting slot 87 and knife L the same as the segment of a large fruit when the turret 63 and stops 60 are lower down.

This gauging mechanism includes a feeler 65 in such a position that it will be hit by the fruit as it is carried over by carrier C under the plungers, and will be moved more or less according to the size of the fruit.

The feeler 65 is carried by a rack 66 which engages a gear 68 on the end of a shaft 67 which extends downward and carries with it a stepped member 69 positioned just below a supporting rod 160 which extends down from the bottom turret 61. It is apparent that when a large apple or other fruit is in position, it will move rack 66 and therefore the steps 69 a greater distance than when a small apple is in position thus allowing each turret to drop a greater distance than when a small apple is fed. The stops 60 therefore drop a less distance for a small fruit than for a large.

The setting mechanism for moving back each turret 61 carrying turret 63 with its supporting rod 160 consists of lifting rods 162, 162, which pass through a yoke bar 163. Each has an adjustable collar 161 which rests on bar 163. Bar 163 is moved up and down by connecting rod 165 moved by a cam 164 on main cam shaft 20. When 165, 163, 162, 161 rise, they lift turrets 63 and 61 and supporting rod 160.

When rod 160 is lifted, a returning spring 168 which surrounds feeler shaft 67 swings steps 69 under rod 160 and carries feeler 65 forward towards carrier finger 33 for the next apple.

Each top turret 63 can oscillate on a turret 61 and is moved by means of a link 260 connected to an arm 261 carried on each end of shaft 262 which is moved by an arm 263 pivoted to connecting rod 264 operated by a cam 265 on shaft 20.

When each segment is positioned in its chute, it is held in that position by means of a guide cover 89 pivoted at the top and forced in by the spring 184 and finger 85 carried by a shaft 84, the end of which 83 is bent and engages a slot in the plunger member 82 carried at the top of a rod 81 which extends down through shaft 92 and is caused to reciprocate at the proper time by one of the cams 80, 80, on shaft 20.

The bevel gears 90, 90, are carried by counter shaft 21 and each engages another bevel gear 91 through which rod 81 passes. Counter shaft 21 carries intermittent gear 27 which is driven by intermittent gear 26 on cam shaft 20.

Gears 48 and 45 and 26 and 27 are so formed that while the plunger is moving, the cutting knife is still and vice versa.

Each gear 91 is fixed to a vertical hollow shaft 92 having a collar 93 which rests on a bracket 94.

This shaft 92 carries at the top the revoluble cutting knife L which is positioned to pass through the cutting slot 87 formed in the angle of each chute F.

There is another hole 88 in the back of each chute F through which passes a member M which serves as a guide and also as an ejector. The other end of ejector M is attached to plunger 82 and moves down with it after the cutting knife has passed, when the member 82 is pulled down thereby releasing the arm 85 and the cover 89. The same downward movement releases the pressure of cover 89 on the segment and pushes it out by means of pusher M.

Referring to Fig. 8, it will be seen that the sides 5, 6, of each segment 1, 2, 3, 4, do not come together but are cut on a curve at 7 corresponding to finger 33.

Normally the lower end 190 of ejector M sticks through hole 88 just above knife hole 87 and keeps the down coming segment from falling out or getting stuck.

The guide cover, 89 which at this time is free, prevents the segment from jumping out.

After the segment hits a stop 60, plunger 82 moves up tightening each finger 85 on its cover 89 thus holding the segment in place, the knife L cuts out the seed cells, top turret 63 oscillates moving stops 60 out of the way so that openings 62 register with 64 under each chute and then plunger 82 moves down releasing 85, 89 and the segments and pushing down the ejectors M, M, M, M, thereby discharging the finished segments.

We prefer to have on each ejector M, a projection 192 which as the ejector descends by coming in contact with a bar 191 at the bottom of ejector hole 88, kicks out end 190 so that the segment is not only pushed down but out away from knife hole 87.

The curve 7 on each fruit segment is concave and a little larger than ejector M which therefore to some extent guides the segment and also tends to throw it forward over knife hole 87 thus avoiding any tendency to jam therein.

Figure 2:
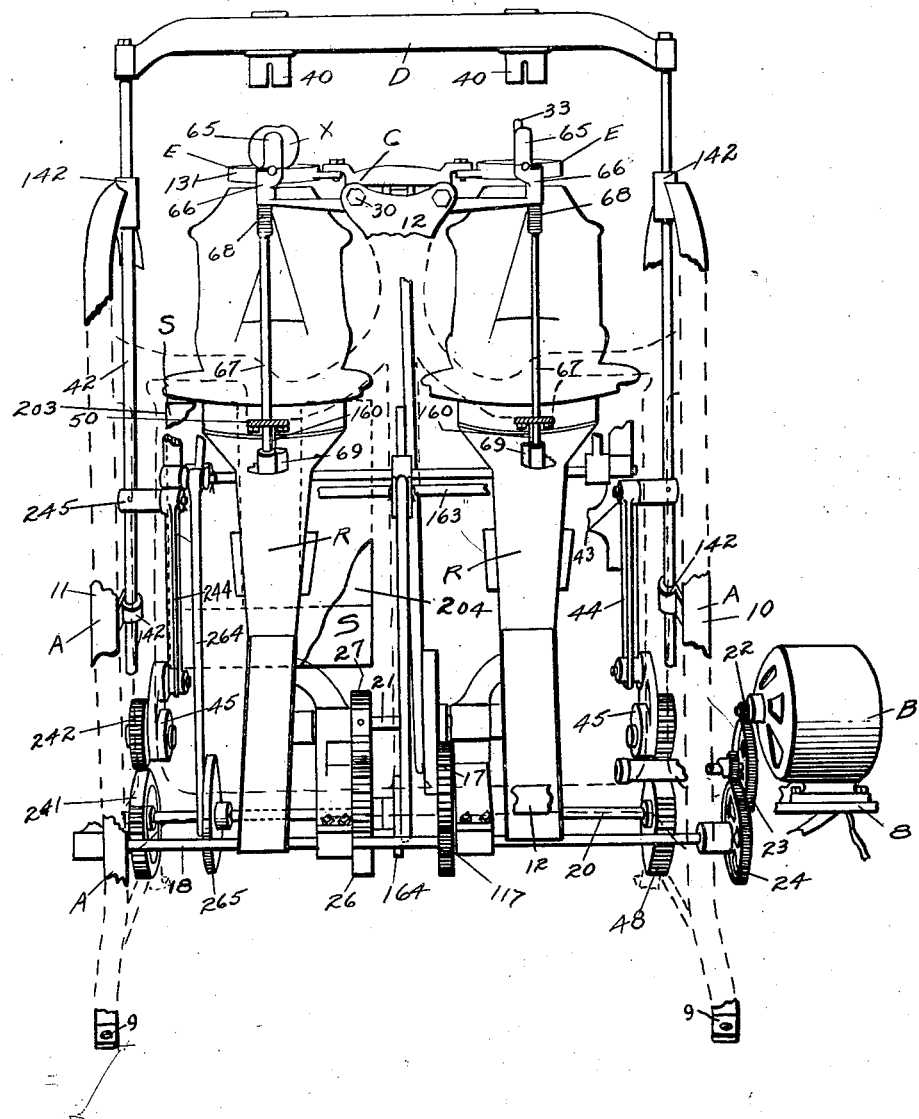
Fig. 2 is a rear elevation of the same machine shown in Fig. 1.
Figure 3:
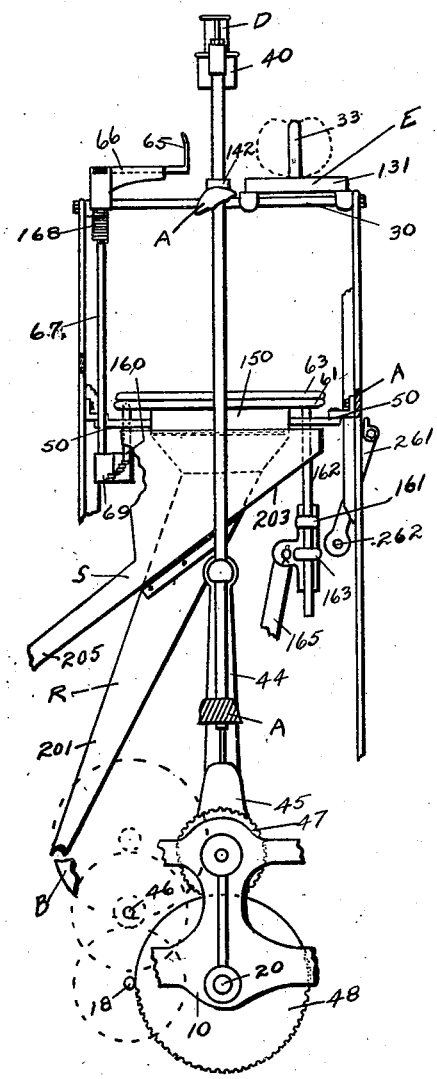
Fig. 3 is a detail in side elevation showing the plunger mechanism and the gauging mechanism.

As shown in Fig. 4, we may use a seed cell chute R of tunnel shape, the top of which 200 fits over the bottom rim of cell receiving tube 150 and the bottom of which 201 extends out beyond the gearing, etc., so that the pulp and seed cells will not get mixed up therewith. See Figs. 2 and 3.

For the finished fruit segments we use a bifurcated chute S having a single delivery spout 205 and branches 203 and 204 which extend around chute R and under the openings 62 in turret 61 which can be so positioned that the two openings at the back are directly behind those at the front.

In carrying out our idea and process, we may dispense with the automatic mechanism for cutting the fruit in segments, and also with the ejector. This does away with the two turrets and the gauge plates with their resetting mechanism and various movements.

In Fig. 12 we have shown diagrammatically, a modified form of holding and discharging mechanism for each chute.

A chute which runs almost vertically downward has the sides 300 and 301 connected at 302 and down this the fruit segments 303 and 304, which have been formed by being pushed through radial knives such as E by a plunger head such as 40, push each other along intermittently.

There is a cutting slot 305 through which a cutting knife 306 revolves either continuously or intermittently. This device would work in a measure if the knife 306 was excessively sharp but we might better use positioning and discharging means indicated at 307 by a sort of six armed paddle wheel which revolves in the chute and takes between each of its two blades a single segment such as 303. It is so made that its blades hold down the segment while it is being cut and it may be intermittently geared so that it will revolve in the direction of the arrow while the knife 306 is making a revolution.

The knife and the feeding and holding device 307 may be coupled together by means of a shaft 313 which carries 307 and ratchet 309 which is intermittently revolved by a pawl 311 on rod 310 which is caused to reciprocate by a crank 308 carried by knife shaft 312.

We believe we are the first to handle the kinds of fruit like apples, which have at one end a stem and at the other end a crown and between them a core, in the following manner.

By first coring or cutting a cylindrical hole, the stem, the crown and part of the core are removed. The fruit is then positioned on a carrier which enters the cored hole and at the bottom has radial knives. By a suitable plunger or advancing mechanism the fruit is pushed through the radial knives, being thereby cut into angular segments, each segment going into an angular chute and advancing along such chute by gravity or otherwise until it is stopped by suitable stopping devices which are regulated by feeling mechanism which feel the size of the fruit and so regulate the stopping means that the middle of the segment where the seed cells are located will dwell in a transverse cutting slot long enough to be cut out by a seed celling knife after which each segment continues along and out of the chute.

We believe we are the first to make the combination just described but we believe we are also the first to assemble means to advance an angular fruit segment along an angular chute with means to cause the segment to dwell at a cutting slot and while so dwelling to cut out the seed cell together with the means to cause the segment to continue and be discharged.

Figure 14:
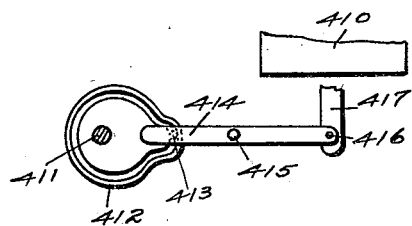
Fig. 14 is a detailed side elevation showing how the cams and gears can be changed in position.

As shown in Fig. 14, for convenience and to keep the working parts away from the possibility of being covered with pulp, we may use rocking motions instead of thrust motions for operating various parts.

410 represents the bottom of the cell receiving tube similar to 150, and 411 represents a cam shaft suitably driven carrying a series of cams such as 412, in the groove of each of which travels a cam follower or roller like 413 at one end of a rocking lever such as 414, pivoted at 415, and at its other end at 416 to operating means such as 417, by which action is given to the various working parts.

We claim:

1. In a seed cell removing apparatus for cored fruit, the combination of a carrier arm with a supporting finger surrounding the bottom of which are fixed radial blades; with a plunger adapted to force the fruit through the blades; a plurality of chutes one for each segment, each chute being of V shape corresponding with the shape between adjoining blades and having a cutting slot through its adjoining sides; a gauge plate positioned near the bottom end of each chute, such gauge plate being adjustable by means of a feeler movable by the fruit when on the finger under the plunger; a holding member for each chute automatically operable to hold each segment in position; a knife revoluble in such position as to pass across each cutting slot in a chute; and an ejector operable to discharge each segment from its chute after the gauge plate and holding member have released said segment.

2. In a seed cell removing apparatus for cored fruit, the combination of a carrier arm with a supporting finger surrounding the bottom of which are fixed radial blades; with a plunger adapted to force the fruit through the blades; a plurality of chutes one for each segment, each chute being of V shape corresponding with the shape between adjoining blades and having a cutting slot through its adjoining sides; a gauge plate positioned near the bottom end of each chute, such gauge plate being adjustable by means of a feeler movable by the fruit when on the finger under the plunger; a holding member for each chute automatically operable to hold each segment in position; a knife revoluble in such position as to pass across each cutting slot in a chute.

3. In a seed cell removing apparatus for cored fruit, the combination of a carrier arm with a supporting finger surrounding the bottom of which are fixed radial blades; with a plunger adapted to force the fruit through the blades; a plurality of chutes one for each segment, each chute being of V shape corresponding with the shape between adjoining blades and having a cutting slot through its adjoining sides; a holding member for each chute automatically operable to hold each segment in position; a knife revoluble in such position as to pass across each cutting slot in a chute.

4. In a seed cell removing apparatus, for cored fruit, the combination of means to cut the fruit in segments; with a plurality of chutes one for each segment, each having a cutting slot through its adjoining sides; a holding member for each chute to hold each segment in position; and a knife movable across each cutting slot.

5. In a fruit seed celling machine, the combination of means to cut the fruit into segments; with receiving chutes for said segments; positioning means adjustable according to the size of the fruit to position each segment in its chute; means to hold each segment in position; cutting means adapted to cut out the seed cell while the segment is so held; and means to release each segment after the seed cell is cut out.

6. In a fruit seed celling machine, the combination of means to cut the fruit into segments; with receiving chutes for said segments; means to hold each segment in position; cutting means adapted to cut out the seed cell while the segment is so held; and means to release each segment after the seed cell is cut out.

7. In a fruit seed celling machine, the combination of means to cut the fruit into segments; with receiving chutes for said segments; means to hold each segment in position; and cutting means adapted to cut out the seed cell while the segment is so held.

8. In a fruit seed celling machine, the combination of fixed radial blades; with a plurality of receiving chutes one for each segment of fruit, each positioned below and between adjoining blades, each chute being of V shape and having a cutting slot through its adjoining sides; means to force the fruit through the knives and into the chutes; means to hold each segment of fruit in position at a cutting slot; cutting means adapted to cut out the seed cell while the segment is so held; and means to move the segment away from the cutting slot after the seed cell is cut out.

9. In a fruit seed celling machine, the combination of means to cut the fruit into segments; with receiving chutes for such segments; means to hold each segment in position in a chute; cutting means adapted to cut out the seed cell while the segment is so held; and means to move the segment away from the cutting means after the seed cell is cut out.

10. In a fruit seed celling machine, the combination with an angular chute having a cutting slot at its angle; with means to hold a segment of fruit in position in said chute at the cutting slot; a cutting knife movable across the cutting slot; and means to move the segment of fruit along the chute away from the cutting slot.

FRANK A. REYNOLDS.
LUCIEN F. L. TURCOTTE.